United States Patent [19]

Taylor

[11] Patent Number: 4,579,187

[45] Date of Patent: Apr. 1, 1986

[54] MULTI-TERRAIN STORES VEHICLE WITH AIR CUSHION AND INTEGRAL HARDENING MEANS

[75] Inventor: Douglas P. Taylor, North Tonawanda, N.Y.

[73] Assignee: Tayco Developments, Inc., North Tonawanda, N.Y.

[21] Appl. No.: 573,846

[22] Filed: Jan. 25, 1984

[51] Int. Cl.$^4$ .......................... B60V 1/00; B60T 1/14
[52] U.S. Cl. ..................... 180/164; 180/126; 188/7
[58] Field of Search ........................ 180/164, 126, 127; 188/7

[56] References Cited

U.S. PATENT DOCUMENTS

| | | | |
|---|---|---|---|
| 2,020,386 | 11/1935 | Ulrich | 188/7 |
| 3,165,217 | 1/1965 | Harris et al. | 180/164 X |
| 3,232,633 | 2/1966 | Feher | 180/164 X |
| 3,892,287 | 7/1975 | Bennett | 180/164 |

FOREIGN PATENT DOCUMENTS 1171040 1/1959 France ....................... 188/7

Primary Examiner—John A. Pekar
Attorney, Agent, or Firm—Joseph P. Gastel

[57] ABSTRACT

An air cushion vehicle including a body, a flexible outer skirt depending downwardly therefrom, a rigid inner skirt within the outer skirt, air moving structure for creating pressure underneath the vehicle for normal driving and for creating a suction within the rigid skirt for holding the vehicle against the ground to withstand ground motion, spikes mounted on the vehicle in a normally retracted position, and structure for driving the spikes into the ground to stabilize the vehicle against lateral forces resulting from overpressure pulses and high winds.

2 Claims, 9 Drawing Figures

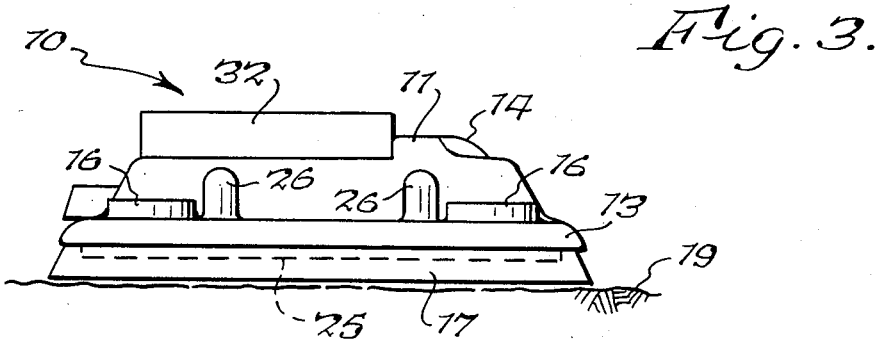
Fig. 3.
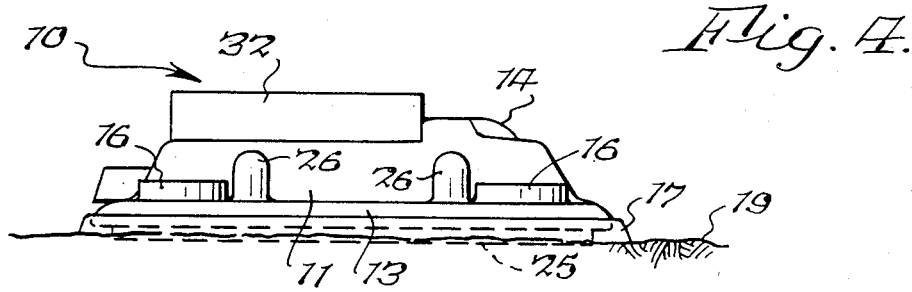
Fig. 4.
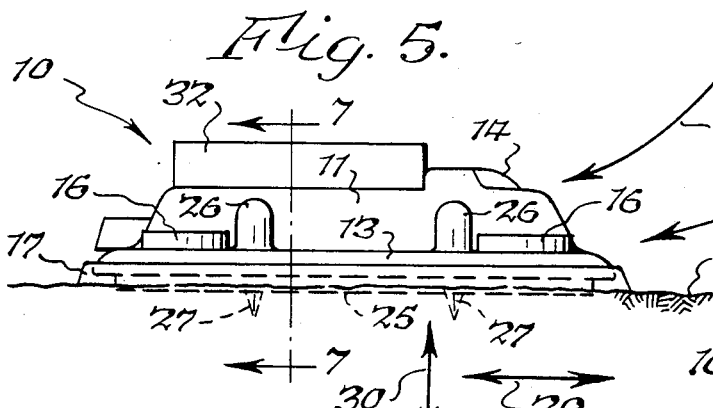
Fig. 5.
Fig. 6.
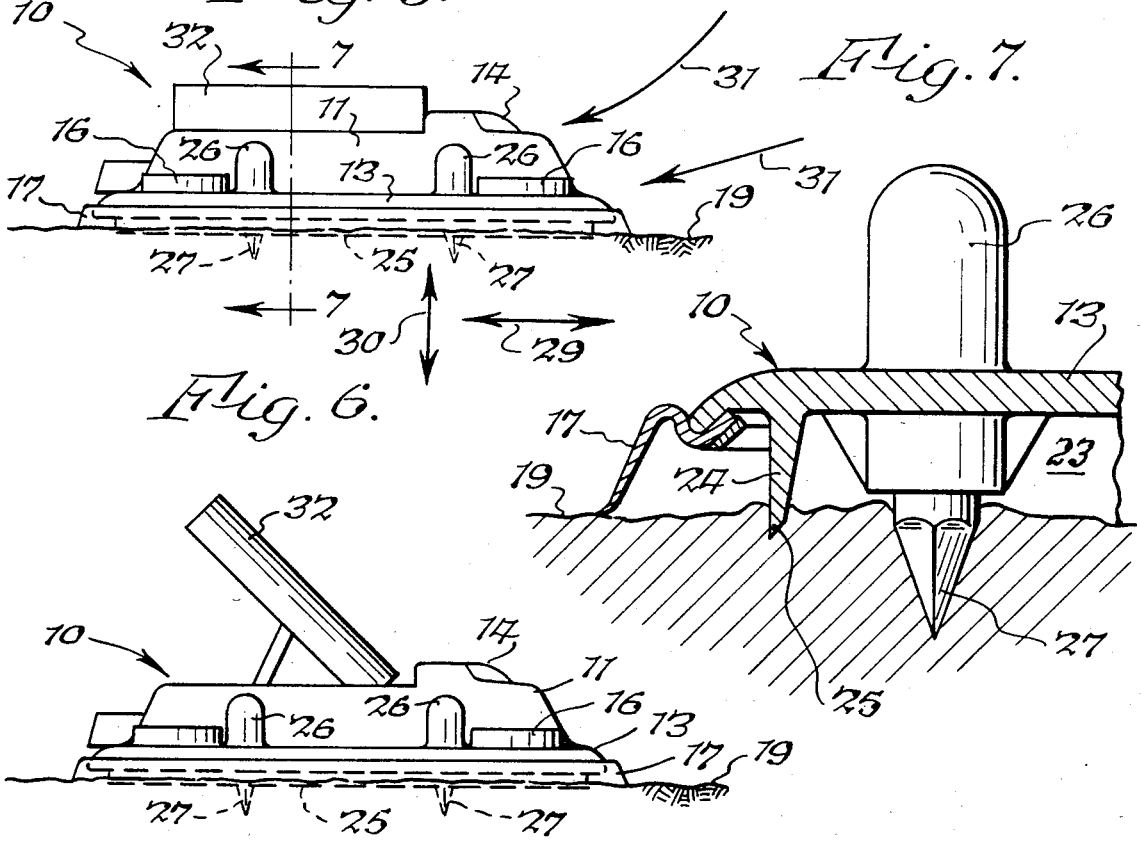
Fig. 7.

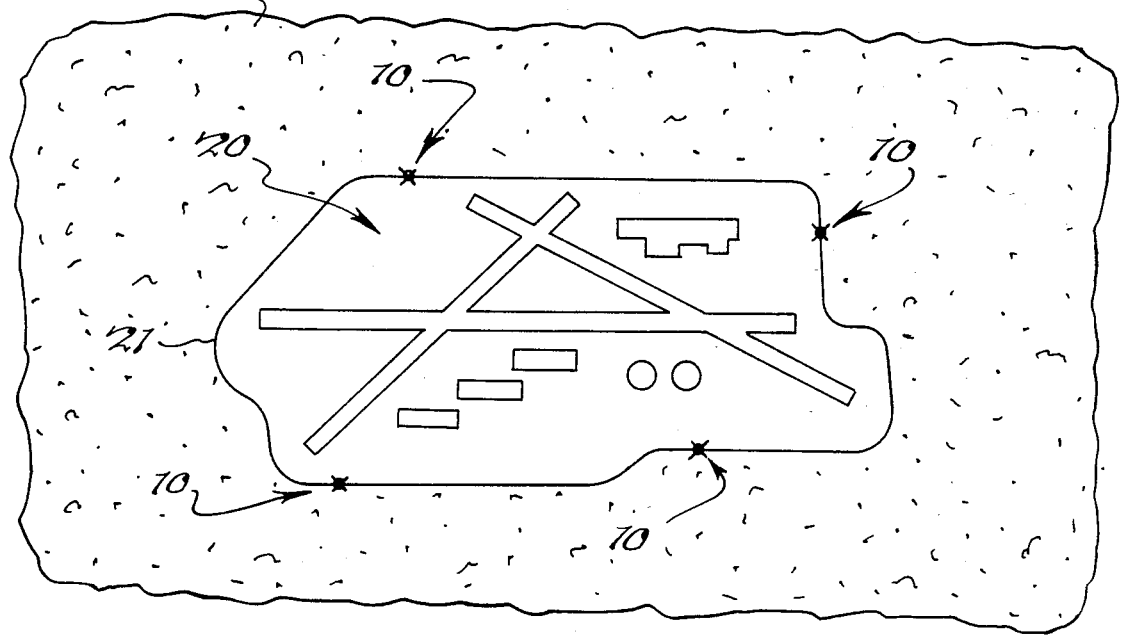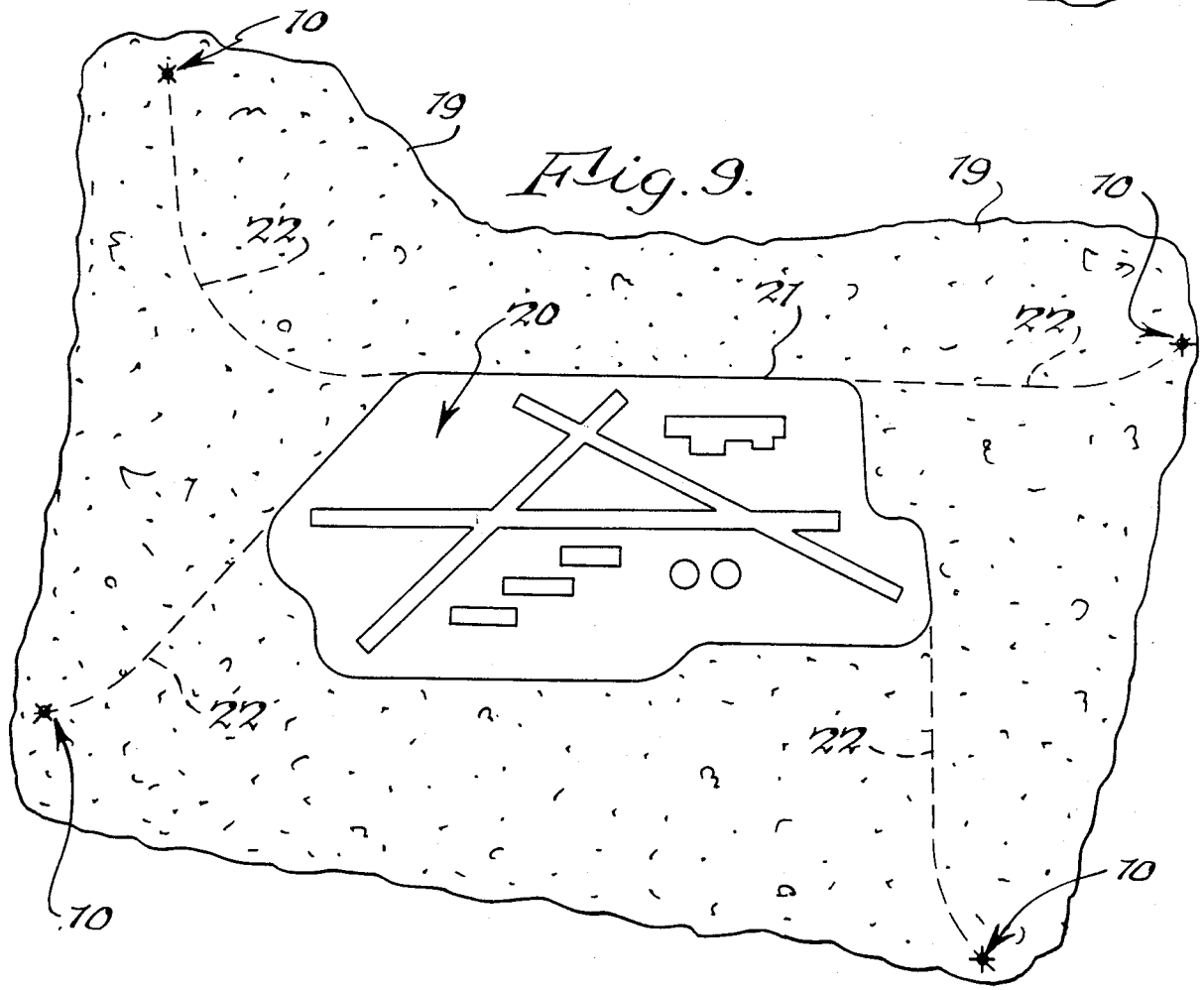

4,579,187

MULTI-TERRAIN STORES VEHICLE WITH AIR CUSHION AND INTEGRAL HARDENING MEANS

BACKGROUND OF THE INVENTION

The present invention relates to an improved stores vehicle with hardening means for withstanding weapons effects.

By way of background, it is believed that a safe way for an above-ground vehicle to withstand weapons effects from high explosive and/or nuclear devices is to deploy the vehicle a sufficiently far distance from ground zero and thereafter firmly anchor the vehicle to the ground so that it rides with the ground motion as the ground moves so that it cannot be moved relative to the ground by weapons blast pressure pulses or the extremely high winds associated therewith.

SUMMARY OF THE INVENTION

It is accordingly the object of the present invention to provide an improved high mobility vehicle of the air cushion type which can travel across rough terrain to thereby move away from ground zero in the event of an anticipated bombing attack, and which can thereafter firmly anchor itself to the ground so that it will not be affected by either ground motion, overpressure pulses, or high winds produced by weapons effects of high explosive or nuclear weapons. Other objects and attendant advantages of the present invention will readily be perceived hereafter.

The present invention relates to an air cushion vehicle comprising a body, skirt means depending downwardly from said body on the outer periphery thereof, air moving means on said body for creating a positive pressure within said skirt means, and spike means for anchoring said body to the ground.

The present invention also relates to an air cushion vehicle comprising a body, skirt means depending downwardly on the outer periphery of said body, and air moving means on said body for creating a positive pressure within said skirt means for lifting said body above the ground and for creating a negative pressure within said skirt means for forcing said skirt means into engagement with the ground with a suction.

The present invention will be more fully understood when the following portions of the specification are read in conjunction with the accompanying drawings wherein:

BRIEF DESCRIPTION OF THE DRAWINGS

FIG. 3 is a side elevational view similar to FIG. 1 showing the vehicle traveling over the ground;

FIG. 4 is a view similar to FIG. 3 but showing the vehicle in a parked position and held against the ground with suction;

FIG. 5 is a view similar to FIG. 4 and showing the spikes extended into the ground for securely anchoring the vehicle thereto;

FIG. 6 is a view similar to FIG. 5 and showing the vehicle with a missile launcher extended;

FIG. 7 is an enlarged fragmentary cross sectional view taken subtantially along line 7—7 of FIG. 5;

FIG. 8 is a fragmentary plan view of a typical installation such as an air base with a perimeter road thereabout and with vehicles of the present invention deployed on said perimeter road when they are on a hold status; and FIG. 9 is a view similar to FIG. 8 but showing the vehicles after they have been taken off of hold status and are moving in different directions away from the installation to avoid attack effects.

DESCRIPTION OF THE PREFERRED EMBODIMENTS

Figure 1:
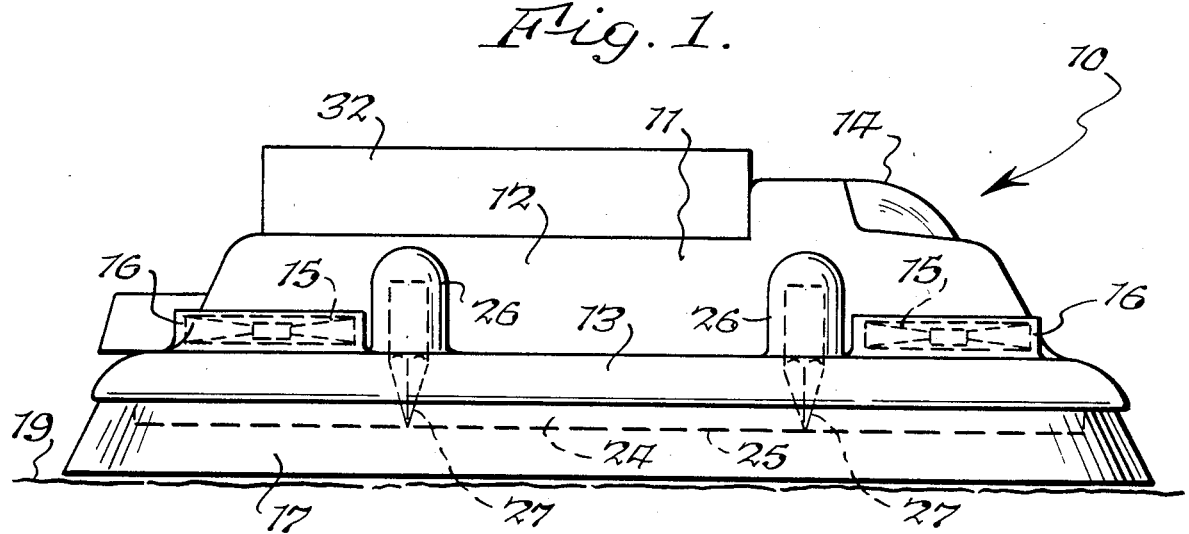
FIG. 1 is a side elevational view of the improved air cushion vehicle of the present invention.
Figure 2:
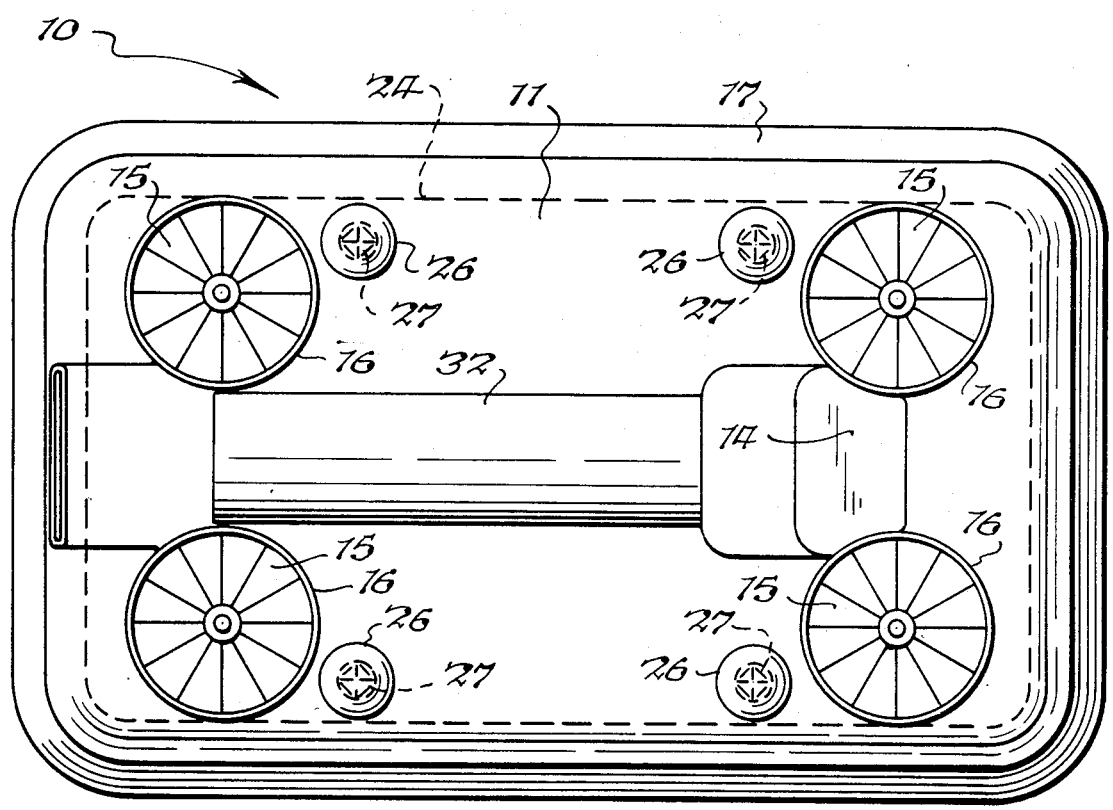
FIG. 2 is a plan view of the vehicle of FIG. 1.

The air cushion vehicle 10 of the present invention includes a body 11 having an upper portion 12 and a lower portion 13. A driver's compartment is located under windshield 14. A plurality of fans 15 are mounted in suitable housings 16 and are driven by motors or engines, not shown, to create a down draft within flexible skirt 17 which depends downwardly from the entire periphery of lower body portion 13 to thereby maintain vehicle 10 in floating relationship to ground 19 (FIGS. 1 and 3).

Referring now to FIGS. 8 and 9, the vehicles 10 are intended to mount a missile or other weapon or carry a command post or carry critical records or personnel or carry other types of material which must be saved in the event of a nuclear attack. The vehicle is commonly known as a stores vehicle. A typical location and use of this vehicle is, for example, on an air base installation 20 which is surrounded by a perimeter road 21, as can be seen from FIG. 8. However, the installation may be of any other type, such as a group of buildings or a factory or an army base, etc. Normally vehicles 10 are assigned to the air base and are parked at suitable locations thereon. Their crews are housed within suitable range of the vehicles and are normally maintained in a state of readiness. If there should be an alert that a war or attack was imminent, the crews take their positions in the vehicles and drive them to perimeter road 21 where they circle the air base while maintaining predetermined distances therebetween. They will continue this circling until one of two conditions occur. If it is determined that the alert is over, they will return to their normal stored position on base 20. However, if it has been determined that an enemy attack has been launched, and there is a probability that a missile or other large weapon has been directed toward base 20, the vehicles 10 will scramble outwardly along paths such as 22 away from perimeter road 21, each of such paths being in a different direction. The area over which they scramble will be rough terrain which includes hills, valleys, stumps, trees, ravines, rivers, creeks and the like. However, because of the fact that they are air cushion vehicles, they will be able to traverse this rough terrain at substantial speed. They will continue their outward movement away from installation 20 for a period of less than the time it is expected for the missile to arrive at the installation. This would usually permit them to travel up to 25 miles away from installation 20.

After the vehicles 10 have reached a position where they can be stabilized before detonation of the incoming missile or similar large weapon on the installation 20, the fans 15 of the vehicle are reversed so that a suction is created within chamber 23 (FIG. 7) underneath lower body portion 13. This will suck the body downwardly toward ground 19 and will cause the lower portion 25 of a rigid inner peripheral skirt 24 to dig into the ground, flexible skirt 17 yielding as shown in FIG. 7 to permit this to happen. It will be understood that rigid skirt 24, as well as flexible skirt 17, extend completely around the entire periphery of the body portion. Thus, the creation of a partial vacuum within chamber 23 will cause the body 11 to hug the ground.

In addition to the foregoing, mounted on lower body portion 13 are a plurality of enlarged capsule-like housings 26 which contain spike members 27 in a retracted position, such as shown in FIG. 1, wherein the lowermost portions of spikes 27 are approximately at the same elevation with the lowermost sharp edge 25 of skirt 24. After the vehicle 10 has been partially stabilized by causing lowermost edge 25 to enter ground 19 (FIG. 7), spikes 27 are actuated from their retracted positions shown in FIG. 1 to their extended positions shown in FIGS. 5, 6 and 7 wherein they are driven into the ground to further stabilize the vehicle. The extension of spikes 27 can be effected by the use of suitable explosive charges within capsules 26 or by the use of suitable hydraulic, pneumatic or mechanical means.

The sum total of the use of the vacuum created by fans 15 and spikes 27 is best shown in FIG. 5 wherein it is shown that spikes 27 stabilize vehicle 10 against movement in all horizontal directions as shown by arrows 29. These horizontal directions are not only from left to right but also into and out of the plane of the drawings and in all directions therebetween. In addition, the suction created by fans 15 within chamber 23 will stabilize the vehicle 10 against movement vertically relative to ground 19 in the direction of arrows 30. This is particularly important because in the event of a nuclear attack or detonation of a large high explosive device, there can be substantial "ground motion" where the concussion from the blast is so violent that the ground will actually drop away and then recoil upwardly. This ground motion can be several feet in magnitude, so that if the ground dropped away from the vehicle and then recoiled, it could shatter the vehicle, whereas by maintaining a firm suction which keeps the vehicle 10 in contact with the ground as it moves up and down, the shattering effect can be eliminated because vehicle 10 hugs the earth in the same manner as a rider would hug a bucking bronco.

In addition to the foregoing, nuclear and other high energy warheads produce what is commonly referred to as "overpressure pulses" associated with them. In actions of this type, there is a large localized pressure increase in the atmosphere when detonation occurs followed by extremely high local winds generated by the pressure increase and depicted by arrows 31. These winds can reach several hundred miles per hour, well over hurricane force, depending on the size of the weapon and the distances of the vehicle form the point of detonation. These winds and pressure pulses could easily overturn the vehicle, or cause it to be pushed along the ground at a speed sufficient to severely damage it should it encounter an obstruction. The combination of spikes 27 embedded in the ground along with the negative pressure created by fans 15 and skirt 24 within chamber 23 causes vehicle 10 to be maintained firmly in engagement with the ground, and to resist any motion along a direction parallel to the ground. Furthermore, the fact that the outer periphery of vehicle 10 is gradually curved upwardly and does not contain any overhangs which can provide a surface for wind engagement, will cause the wind bursts and the overpressure pulses to have less effect on the vehicle than one having conventional shape. Thus, vehicle 10 can be firmly anchored to the ground to resist the various forces to which it may be subjected during a nuclear or other high yield explosive detonation.

After the attack has terminated so that the vehicle is no longer subject to high forces, the missile launcher 32 can be raised by suitable mechanism to the position shown in FIG. 6 wherein it can be fired. However, as noted above, vehicle 10 need not carry a missile launcher but can be used for other of the enumerated purposes.

When the vehicle is to move from its anchored location, the spikes 27 are retracted by suitable mechanism and fans 15 are actuated to raise the vehicle above the ground so that it can move to a new location.

It can thus be seen that the improved vehicle of the present invention is manifestly capable of achieving the above-enumerated objects and while preferred embodiments of the present invention have been disclosed, it will be appreciated that it is not limited thereto, but may be otherwise embodied within the scope of the following claims.

What is claimed is:

1. An air cushion vehicle comprising a body, rigid skirt means depending downwardly from said body, a flexible skirt depending downwardly from said body and spaced outwardly of said rigid skirt, air moving means on said body for creating a positive pressure within said rigid skirt means for lifting said body above the ground and for creating a negative pressure within said rigid skirt means for forcing said rigid skirt means into engagement with the ground with a suction, spike means on said body for anchoring said body to the ground, said spike means being located within the perimeter of said rigid skirt means, and means for driving said spike means downwardly from said body into the ground when said negative pressure is created to thereby stabilize said air cushion vehicle to the ground.

2. An air cushion vehicle as set forth in claim 1 wherein said body is curved gradually upwardly substantially throughout its entire extent.

* * * * *

UNITED STATES PATENT AND TRADEMARK OFFICE
CERTIFICATE OF CORRECTION

PATENT NO. : 4,579,187
DATED : April 1, 1986
INVENTOR(S) : Douglas P. Taylor

It is certified that error appears in the above-identified patent and that said Letters Patent are hereby corrected as shown below:

Column 4, line 50 (claim 1), after "vehicle" insert --relative--

Signed and Sealed this

First Day of July 1986

[SEAL]

Attest:

DONALD J. QUIGG

Attesting Officer

Commissioner of Patents and Trademarks